US007096462B2

(12) United States Patent
Chan et al.

(10) Patent No.: US 7,096,462 B2
(45) Date of Patent: Aug. 22, 2006

(54) SYSTEM AND METHOD FOR USING DATA ADDRESS SEQUENCES OF A PROGRAM IN A SOFTWARE DEVELOPMENT TOOL

(75) Inventors: Hon Keat Chan, Bellevue, WA (US); Hoi H. Vo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/144,947

(22) Filed: May 13, 2002

(65) Prior Publication Data

US 2003/0212985 A1    Nov. 13, 2003

(51) Int. Cl.
*G06F 9/45* (2006.01)
(52) U.S. Cl. .................. 717/159; 717/154; 717/155
(58) Field of Classification Search ........ 717/124–135, 717/151–161, 136
See application file for complete search history.

(56) References Cited

U.S. PATENT DOCUMENTS 5,752,038 A * 5/1998 Blake et al. ............... 717/158
5,790,865 A * 8/1998 Smaalders et al. ......... 717/158
6,269,477 B1   7/2001 Fitzgerald et al. ............. 717/4
6,301,705 B1 * 10/2001 Doshi et al. ................ 717/154
6,351,844 B1 * 2/2002 Bala ........................... 717/128
6,381,740 B1   4/2002 Miller et al. .................. 717/9
2003/0130834 A1* 7/2003 Krishnan ...................... 703/26

* cited by examiner

*Primary Examiner*—Tuan Dam
*Assistant Examiner*—John J. Romano
(74) *Attorney, Agent, or Firm*—Merchant & Gould P.C.; Mark R. Hennings

(57) ABSTRACT

Rapid determination of placement for code and data for optimal access of the code and data during execution of software applications. An application that is to be efficiently arranged in a software carrier medium is instrumented such that the status of whether a particular unit of code or data has been accessed during a time interval is recorded in a time-ordered bit sequence for each such unit. A sort routine is used to sort the order of time-ordered bit sequences within an array of such sequences. The sort routine invokes a comparison function that operates upon the temporal information stored in the two time-ordered bit sequences that are being compared for the routine. The order of the code and data in the software application is reordered in accordance with the results of the sort routine.

9 Claims, 9 Drawing Sheets

```
Initialize (paramlist);

While (logical_condition==TRUE)
{
    .
    .
    .
}

Finalize (paramlist);
Return;
```

Fig. 3

SYSTEM AND METHOD FOR USING DATA ADDRESS SEQUENCES OF A PROGRAM IN A SOFTWARE DEVELOPMENT TOOL

FIELD OF THE INVENTION

The present invention relates generally to computer-executable software applications and, more particularly, to rapid determination of placement for code and data segments such that code and data can be more efficiently accessed during execution of software applications.

BACKGROUND OF THE INVENTION

The amount of memory available to a computer (and the relative speeds of the types of such memory) influences the speed at which a computer is able to execute a software application. Additionally, the organization of stored data and code within a computer's memory is important to the relative speed in which a computer is able to access and manipulate the stored data and code. Randomly or incoherently organized stored data and code often results in inefficient accesses of the stored data and code. Such inefficient accesses may include cache misses and virtual memory page swapping, which may slow the execution of a software application by a computer. Increasing the amount of fast memory available to the computer often increases the speed at which a computer is able to execute a software application. Additional gains in processing efficiency may be gained by arranging the stored data and code so that the stored data and code may be efficiently accessed.

SUMMARY OF THE INVENTION

The present invention is directed to a method and apparatus that provides rapid determination of placement for code and data for optimal access of the code and data during execution of software applications. An application that is to be efficiently arranged in a software carrier medium is instrumented such that the status of whether a particular unit of code or data has been accessed during a time interval is recorded in a time-ordered bit sequence for each such unit. A sort routine is used to sort the order of time-ordered bit sequences within an array of such sequences. The sort routine invokes a comparison function that operates upon the temporal information stored in the two time-ordered bit sequences that are being compared for the routine. The order of the code and data in the software application is reordered in accordance with the results of the sort routine.

According to one aspect of the invention, a method for improving the ordering of data units for access by a target application comprises executing the target application to determine which data units are accessed by the target application at various times. Time-ordered bit sequences are generated that indicate the status of whether each data unit of the target application has been accessed during a time interval within the sequence of time intervals. The sequence of time intervals is contemporaneous with the time of the execution of the target application. The array of time-ordered bit sequences is sorted by comparing information contained within the time-ordered bit sequences. The relationships between the generated and the sorted time-ordered bit sequences is mapped such that the accessed data units can be arranged in a computer-readable media according to the mapping generated during the sort.

According to another aspect of the invention, a system for arranging data units in computer-readable media for efficient access of the data units by target software applications comprises a generator, a sorter, and an arranger. The generator is configured to generate a set of time-ordered bit sequences that indicate the status of whether a particular data unit of the target application has been accessed during a particular time interval within the sequence of time intervals. The sorter is configured to sort the set of generated time-ordered bit sequences according to the information that is contained within the generated time-ordered bit sequences. The sorter uses the information to generate a set of sorted time-ordered bit sequences. The arranger is configured to arrange the data units of a target software application according to the order of the time-ordered bit sequences within the set of sorted time-ordered bit sequences.

BRIEF DESCRIPTION OF THE DRAWINGS

FIG. 3 is a listing of a block of example code that is used to illustrate the generation of an example of time-ordered bit sequence set in accordance with the present invention.

DETAILED DESCRIPTION OF THE PREFERRED EMBODIMENT

The present invention is directed to a method and apparatus that provides rapid determination of placement for code and data segments such that code and data can be more efficiently accessed during execution of software applications. An application that is to be efficiently arranged in a software carrier medium is instrumented such that the status of whether a particular unit of code or data has been accessed during a time interval is recorded in a time-ordered bit sequence for each such unit. A sort routine is used to sort the order of a set of time-ordered bit sequences within an array of such sequences. The sort routine invokes a comparison function for comparing a pair of time-ordered bit sequences in the course of ordering the set of sequences. The comparison function operates upon the temporal information stored in the two time-ordered bit sequences to determine the ordering of the time-ordered bit sequences. The order of the code and data in the software application is reordered in accordance with the results of the sort routine.

Figure 1:
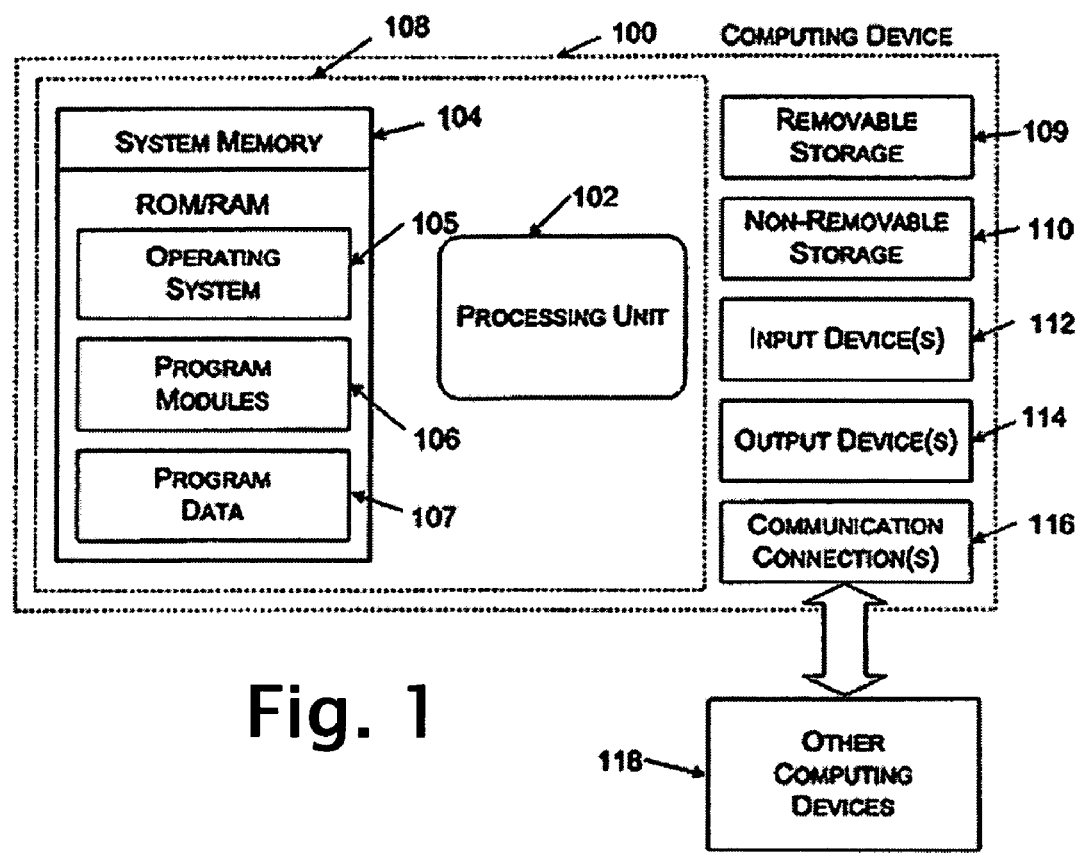
FIG. 1 is a functional block diagram of a computing device adapted to implement an embodiment of the invention.

With reference to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules or other data. System memory 104, removable storage 109 and non-removable storage 110 are all examples of computer storage media. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer-readable media as used herein includes both storage media and communication media.

Figure 2:
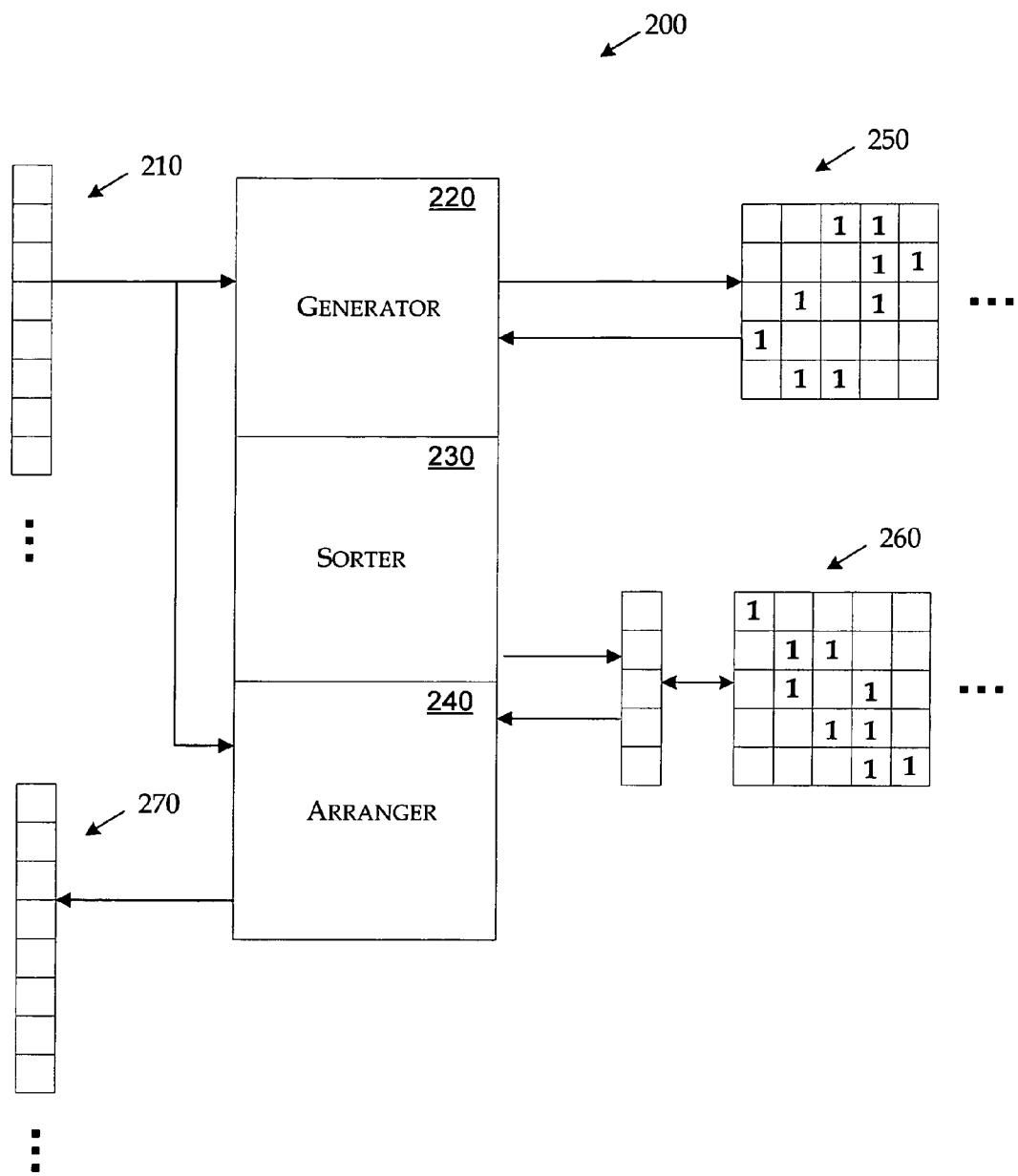
FIG. 2 shows an overview schematic of a system for efficiently arranging data and code in computer-readable media for enhanced access times.

FIG. 2 shows an overview schematic of a system for efficiently arranging data and code in computer-readable media for enhanced access times. As shown in the figure, system 200 includes data set 210, generator 220, sorter 230, arranger 240, generated time-ordered bit sequence set 250, sorted time-ordered bit sequence set 260, and ordered data set 270. Data set 210 is coupled to generator 220 and arranger 240, generator 220 is coupled to data set 210 and generated time-ordered bit sequence set 250. Sorter 230 is coupled to generated time-ordered bit sequence set 250 and sorted time-ordered bit sequence set 260. Arranger 240 is coupled to data set 210, sorted time-ordered bit sequence set 260, and ordered data set 270. Time-ordered bit sequence set 250 is coupled to generator 220 and sorter 230. Generated sorted time-ordered bit sequence set 260 is coupled to sorter 230 and arranger 240. Ordered data set 270 is coupled to arranger 240.

Data set 210 is information residing in computer-readable media. The information residing in data set 210 may be units of code and/or data ("data units"). The data units may be segregated in convenient groups such as bits, bytes, words, blocks, segments, pages, and the like. The data units in data set 210 are accessed by a computing device executing a particular program. The data units can be arranged so that the computing device executing a particular program can efficiently access the data units.

Generator 220 monitors the sequence of requested information from data set 210 by a computing device executing a particular program. Generator 220 constructs a generated time-ordered bit sequence set 250 in response to the sequence of requested information. Generated time-ordered bit sequence 250 contains information that indicates when particular units of information are accessed. Sorter 230 analyzes and sorts generated time-ordered bit sequence set 250 to produce a sorted time-ordered bit sequence set 260. Arranger 240 arranges the information from data set 210 according to the sorted time-ordered bit sequence set 260 to produce ordered data set 270. Ordered data set 270 contains information that is arranged for efficient access by a computing device that subsequently executes the particular program.

Generator 220 monitors and logs the accesses of data units from data set 210 as a particular program is being executed. According to various embodiments generator 220 may be embodied in software such as instrumented code, embodied in hardware such as a logic analyzer, or a hardware/software combination. Generator 220 records the access status of each data unit during a particular sampling interval. The length of the sampling interval can be adjusted according to the types of data units that are being monitored. For example, word-length data units may be sampled every clock cycle, whereas page-length data units may be sampled according to disk access rates.

Generator 220 logs the status of the accesses of data units in generated time-ordered bit sequence set 250. According to one embodiment, generated time-ordered bit sequence set 250 is a bi-dimensional matrix having a first dimension that is ordered according to time and a second dimension that is ordered according to the sequence of data units for a particular program that reside in a computer-readable medium. For each sampling interval, generator 220 determines which data units have been accessed during the sampling interval, and records the information in a column of generated time-ordered bit sequence set 250. During successive sampling intervals, the information is recorded in successive columns of generated time-ordered bit sequence set 250. Thus, rows are constructed that contain the histories of the accesses of each data unit over time. Each row is a time-ordered bit sequence. In various embodiments, the histories can be recorded over a particular time or phase of execution of a program. For example, the start time and the end time of the histories can be adjusted to encompass phases of an executed program such as invocation, load-time, runtime, shutdown, and the like.

Sorter 230 determines the final ordering of the data units of a particular program for storage or transmission in a computer-readable medium. Sorter 230 operates according to the principle that data units that are accessed closely in time should be ordered closely together within a computer-readable medium. Examination of the time-ordered bit sequences reveals when particular data units are accessed. Sorter 230 may use a sorting algorithm to order time-ordered bit sequences within generated time-ordered bit sequence set 250. The sorting algorithm arranges more closely time-ordered bit sequences that correspond to data units that have been accessed at close time intervals. The arrangement of the sorted time-ordered bit sequences is stored in ordered data set 270.

The close arrangement of time-ordered bit sequences in a computer-readable medium results in a working set reduction for the time period over which the sorting algorithm has been prioritized. A working set comprises the data units that are loaded from a computer-readable medium into a short-term memory at a particular time.

Sorter 230 sorts the time-ordered bit sequences in generated time-ordered bit sequence set 250 to produce sorted time-ordered bit sequence set 260. In various embodiments, sorter 230 uses "logarithmic" sorting techniques such as heap sort, quick sort and the like. In other embodiments, sorter 230 uses "N-squared-type" sorting techniques. Using N-squared-type sorting techniques for large sets results in greater numbers of comparisons over logarithmic sorting techniques. This is because the number of comparisons required in the in N-squared-type sorts increases in proportion to the square of the number of elements to be sorted, while in logarithmic sorts the number of comparisons only grows in proportion to the logarithm of the number of elements to be sorted.

Sorter 230 includes a comparator that operates to determine the arrangement of the time-ordered bit sequences. The comparator compares portions of two time-ordered bit sequences. In various embodiments, the comparison evaluates each sequence by forming a numerical value that is derived from the value of the binary numbers formed by a specified portion of the time-ordered bit sequences. The inputs to the comparator include the time period over which comparisons are to be made, a first time-ordered bit sequence and a second time-ordered bit sequence. The time period can be specified as, for example, the starting time and the run length. The time period can be selected to encompass a particular portion (or "phase") of a program's execution (e.g., load-time). This allows the ordering of the required units of data residing in computer-readable media to be optimally ordered for the particular portion of a program's execution. The comparator outputs a value that indicates whether the specified portion of each sequence is equal, and if not, which sequence has a numerical value that is larger than the other sequence. If an equal result is reached, the comparator can evaluate other portions of the time-ordered bit sequences. Other portions of the time-ordered bit sequences can be evaluated by the relative importance of a phase of the execution of the program.

In various embodiments, the comparator used by sorter 230 can be a comparison function (which is discussed below with reference to FIG. 8). The comparison function can be called iteratively or recursively until the comparison function returns a value that indicates an inequality. During each iteration or recursion the portions of the sequences may be changed to increase the chances that an inequality will be encountered. The portion of the time-ordered bit sequence compared may be selected according to the relative importance of a phase of the execution of the program.

When sorter 230 has finished sorting time-ordered bit sequence set 250, the sorted time-ordered bit sequences are stored in sorted time-ordered bit sequence set 260. Sorter 230 maintains a map of the reordering of the time-ordered bit sequences. In one embodiment, each time-ordered bit sequence of generated time-ordered bit sequence set 250 is mapped to a corresponding sequence in sorted time-ordered bit sequence set 260. Additionally or alternatively, each time-ordered bit sequence of the sorted time-ordered bit sequence set 260 is mapped to a corresponding generated time-ordered bit sequence in time-ordered bit sequence set 250. The mapping is used to reorder the data units that are stored in data set 210.

Arranger 240 reorders the data units found in data set 210 to form ordered data set 270. Arranger 240 uses the mapping provided by sorted time-ordered bit sequence set 260 to arrange the data units in data set 210 in the same order of the corresponding time-ordered bit sequences found in sorted time-ordered bit sequence set 260. The arranged data units from data set 210 are stored in ordered data set 270.

Figure 3:
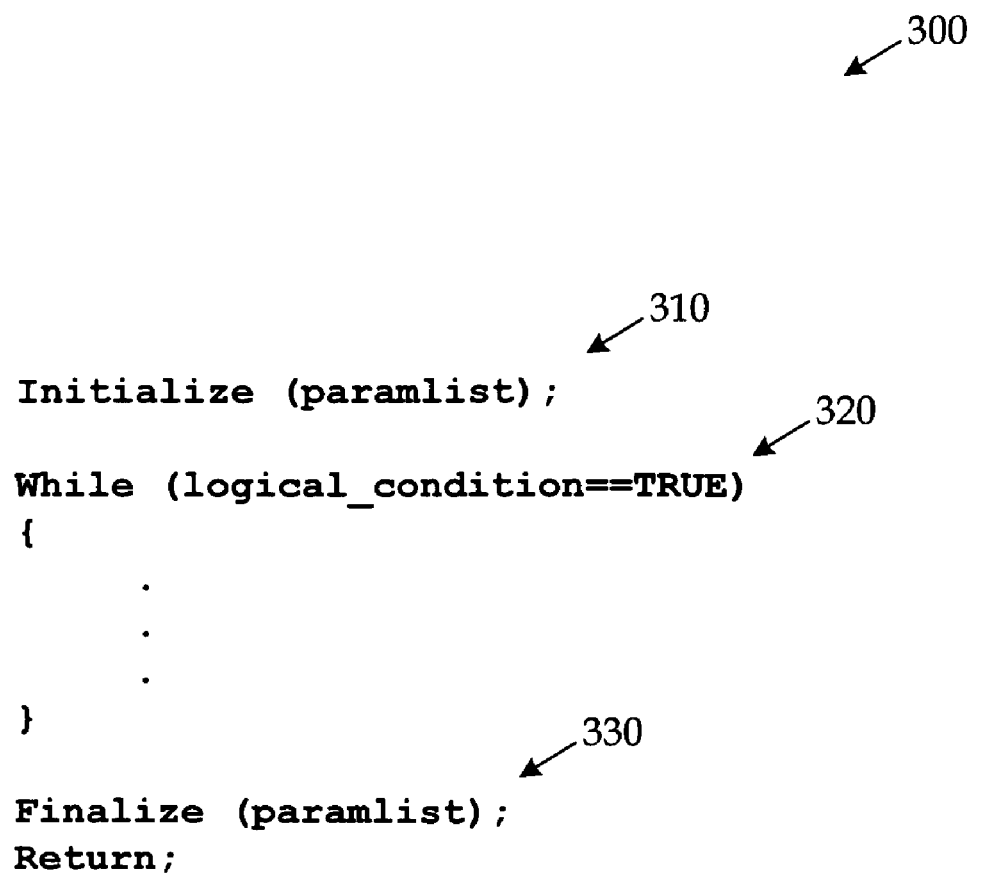

FIG. 3 is a listing of a block of example code that is used to illustrate the generation of an example of time-ordered bit sequence set in accordance with the present invention. Code block 300 comprises three data units. Data unit 310 contains an instruction that is, for example, executed at the beginning of the execution of code block 300. After data unit 310 has been executed, data unit 320 will be executed. Data unit 320 contains a loop instruction that is, for example, executed repeatedly until a logical condition is satisfied. After the logical condition in data unit 320 is satisfied, data unit 330 can be executed. Data unit 330 contains an instruction that is, for example, executed at the end of the execution of code block 300.

The data units, as exemplified in FIG. 3, may be of any convenient size that is useful for determining the arrangement of the data units within computer-readable media. In various embodiments, software flow analysis programs can be used to delineate sections of code such that boundaries for data units may be determined. Additionally, the sizes and associations of data types may be used to delineate sections of data such that data unit boundaries can be determined.

Figure 4:
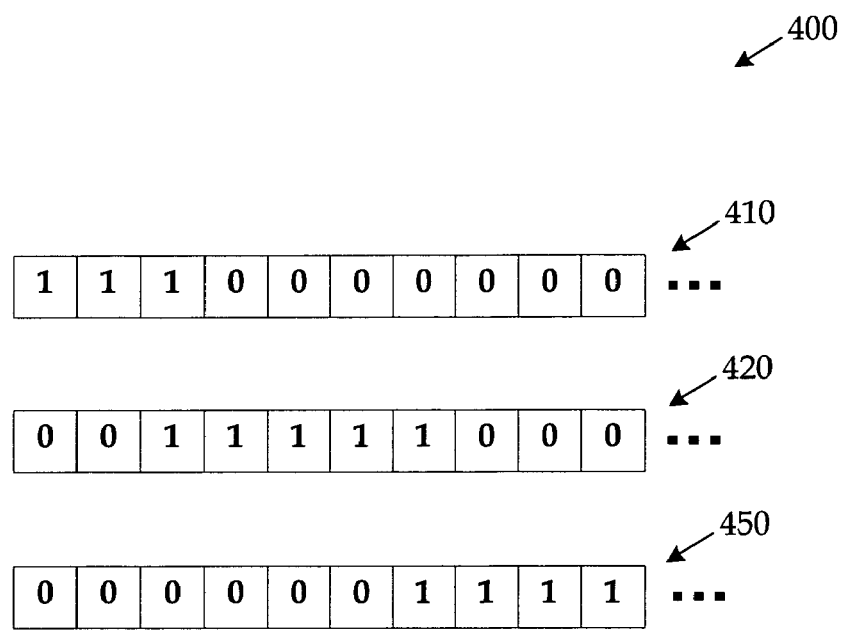
FIG. 4 is a listing of example time-ordered bit sequences generated for each of the data units comprised by code block 300 during the execution of code block 300 in accordance with the present invention.

FIG. 4 is a listing of example time-ordered bit sequences generated for each of the data units comprised by code block 300 during the execution of code block 300 in accordance with the present invention. Time-ordered bit sequence set 400 comprises three time-ordered bit sequences such that each time-ordered bit sequence corresponds to a data units comprised by code block 300. Time-ordered bit sequence 410 corresponds to data unit 310. Each bit of time-ordered bit sequence 410 indicates whether data unit 310 has been accessed during a period of time represented by each bit of the time-ordered bit sequence. Time-ordered bit sequence 410 has its three initial bits set and all of its following bits cleared. The pattern of time-ordered bit sequence 410 indicates that data unit 310 has been executed during the beginning of the execution of code block 300. Time-ordered bit sequence 420 corresponds to data unit 320. In similar fashion, each bit of time-ordered bit sequence 420 indicates whether data unit 320 has been accessed during a period of time represented by each bit. Time-ordered bit sequence 420 has two initial bits cleared, a sequence of bits that are set, and a final sequence of bits that are cleared. The pattern of time-ordered bit sequence 420 indicates that data unit 320 has been executed in the middle of the execution of code block 300. Time-ordered bit sequence 430 corresponds to data unit 330. Time-ordered bit sequence 430 has a sequence of initial bits that are cleared and a sequence of succeeding bits that are set. The pattern of time-ordered bit sequence 430 indicates that data unit 330 has been executed towards the end of the execution of code block 300. Thus, the need to access a particular data unit during a particular time interval can be determined by examining bits within a time-ordered bit sequence set.

Each time period (which is represented by each bit column within time-ordered bit sequence set 400) may be of equal or unequal lengths. The time period may be set according to lengths of time that are significant and/or convenient for the efficient arrangement of data. For example, the time period may be set according to the time required for a context switch, a disk access, a virtual memory page swap, and the like.

Figure 5:
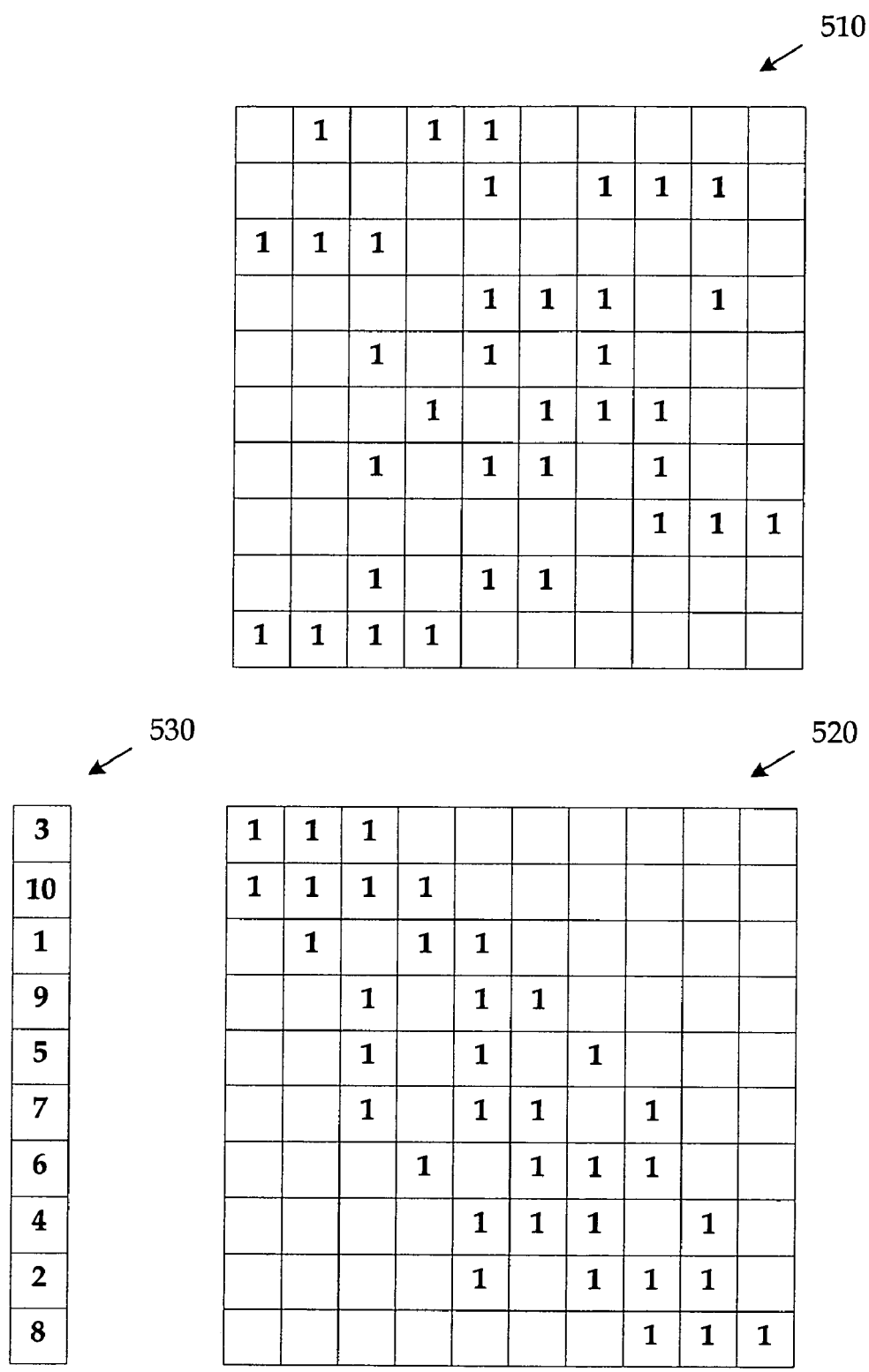
FIG. 5 is a listing of example of generated and sorted time-ordered bit sequence sets in accordance with the present invention.

FIG. 5 is a listing of example of generated and sorted time-ordered bit sequence sets in accordance with the present invention. Time-ordered bit sequence set 510 is an example time-ordered bit sequence that is produced by generator 220. Each row of time-ordered bit sequence set 510 is a time-ordered bit sequence for a particular data unit. Time-ordered bit sequence set 520 is an example sorted time-ordered bit sequence that is produced by sorter 230. The ordering of the rows of time-ordered bit sequence set 520 is determined by the comparison function used by sorter 230 during the sorting process. Mapping 530 provides an index that maintains the relationship between the ordering of the rows between time-ordered bit sequence 510 and sorted time-ordered bit sequence set 520.

For clarity in FIG. 5, time-ordered bit sequences 510 and 520 are shown with relatively few rows and columns. In practice, the number of rows and columns may often extend beyond 1000. Likewise, mapping 530 has been shown with relatively few rows. Also for clarity, bit locations having a bit value of equal to 0 have been left blank.

Figure 6:
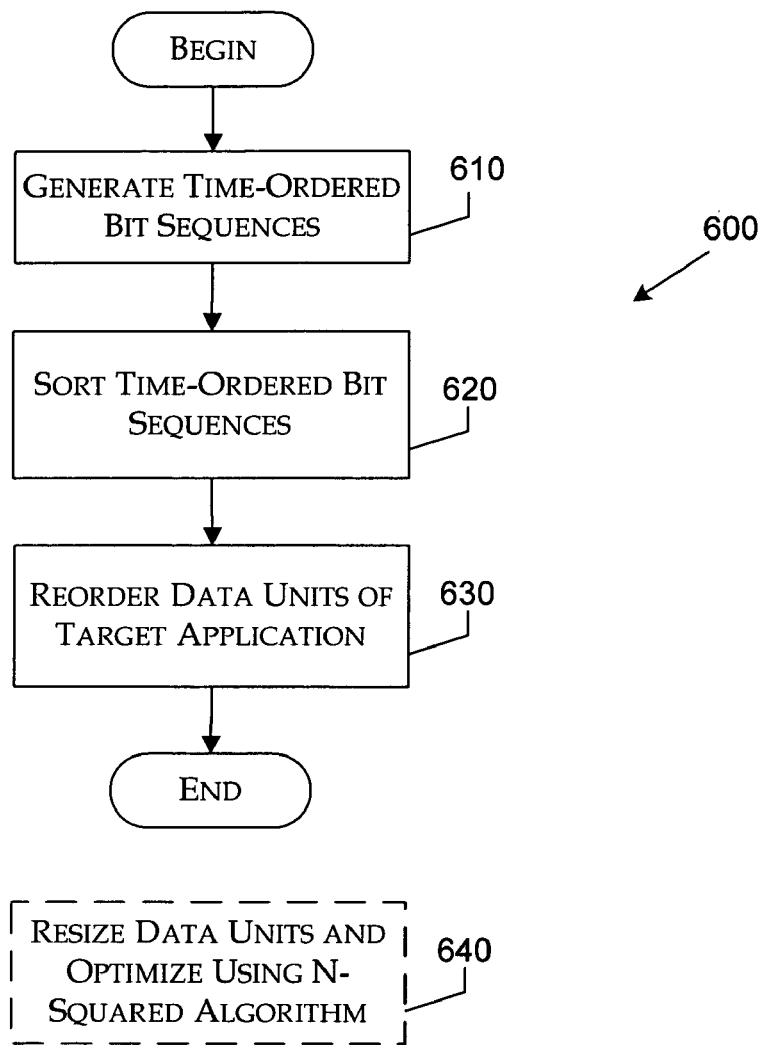
FIG. 6 is a high-level flow diagram illustrating a process for efficiently arranging data and code in information delivery media for efficient retrieval in accordance with the present invention.

FIG. 6 is a high-level flow diagram generally illustrating a process for efficiently arranging data and code in information delivery media for efficient retrieval in accordance with the present invention. The process 600 begins at step 610 where time-ordered bit sequences are generated for data units of a software application that is to be optimized. In various embodiments, instrumented software monitors whether a particular data unit has been accessed during a time interval and records the status in a bit sequence for each data unit. The generation of time-ordered bit sequences is more fully described below with reference to FIG. 7.

At step 620, the set of time-ordered bit sequences that was generated in step 610 is sorted by comparing values derived from the time-ordered bit sequences being compared. The derived value is used by the sorting algorithm to determine the ordering of time-ordered bit sequences with respect to other time-ordered bit sequences. The sorting of time-ordered bit sequences is more fully described below with reference to FIG. 8.

At step 630, the data units (for which time-ordered bit sequences have been generated) are reordered in accordance with the ordering for the time-ordered bit sequences determined in step 620. The reordered data units are stored in computer-readable media such that the data units may be efficiently accessed. The ordering of the data units is more fully described below with reference to FIG. 9.

Optional step 640 discloses that the disclosed method and system for arranging data units in a target application may be combined with methods that generate an "N-squared" number of affinities. Such N-squared-type affinity methods may be able to generate more optimally ordered data units than steps 610–630, albeit the time requirements for calculating the affinities amongst all the data units grows exponentially with the number of data units. The complexity also increases with the length of the execution of the target application. In a combined method, one technique may be used to efficiently order large-sized data units, and the other technique may be used to efficiently order the sub-data units contained within each large-sized data unit. For example, large-sized data units within a target application may be can be sorted using the sorted in accordance with steps 610–630, and the sub-data units within each large-sized data unit can be sorted by using an N-squared-type affinity method.

Figure 7:
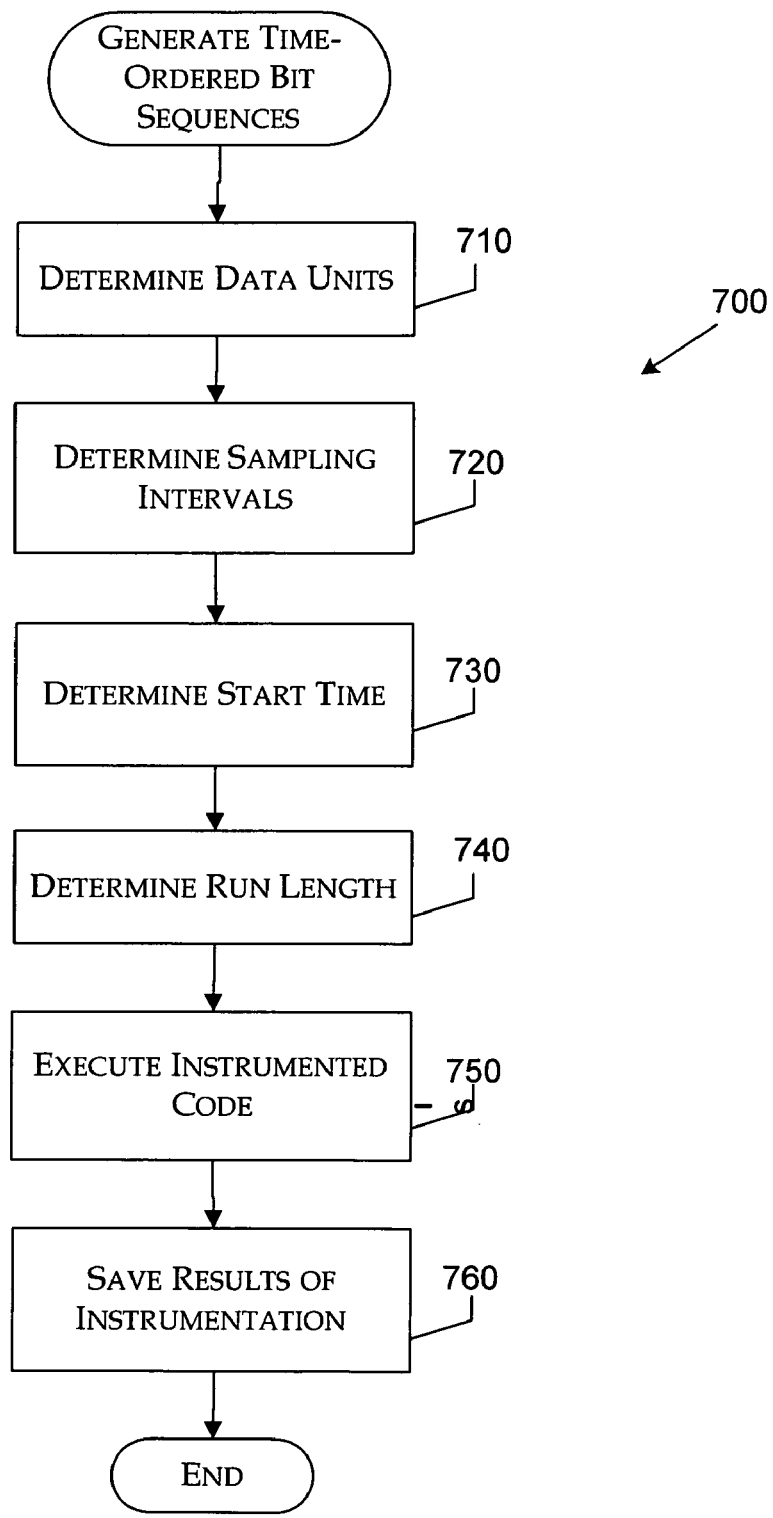
FIG. 7 is a flow diagram illustrating a process for generating time-ordered bit sequences in accordance with the present invention.

FIG. 7 is a flow diagram generally illustrating a process for generating time-ordered bit sequences in accordance with the present invention. The process begins at step 710, where data units for the target application are determined. The data units may be determined by segregating code and data for the target application into groups of a convenient size as discussed above with reference to FIG. 3. At step 720, the sampling intervals for each bit location in the time-ordered bit sequences is determined. The sampling intervals may be separated by any convenient length of time as discussed above with reference to FIG. 4. At step 730, the start time of the instrumentation is determined. This allows time-ordered bit sequences to be generated starting at a particular time. At step 740, the run length of the instrumentation is determined. This allows the time of the time-ordered bit sequences to extend for a desired length. Activating the instrumentation for a particular time interval allows data units to be efficiently organized for a particular portion of the target applications execution. At step 750, instrumented code is executed. Time-ordered bit sequences are generated for each data unit of the target application for the period of time that the instrumentation is active. At step 760, the results of the instrumentation are saved. The time-ordered bit sequences are saved in long-term memory for future access.

Figure 8:
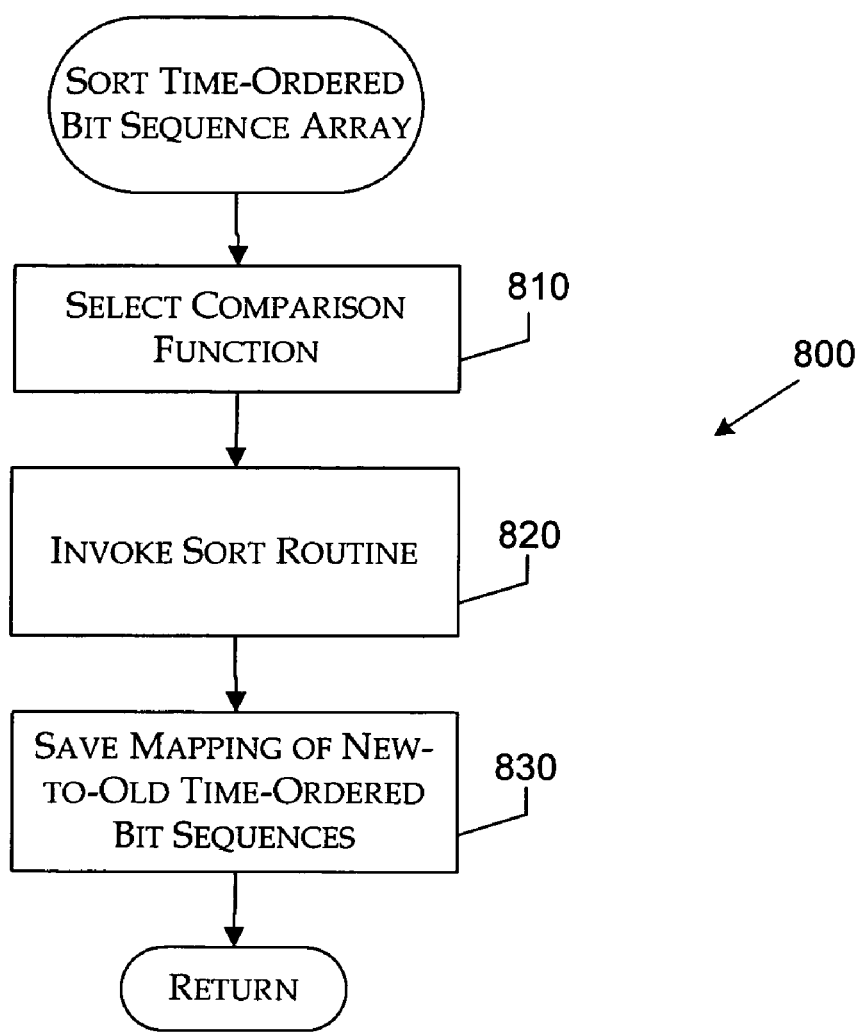
FIG. 8 is a flow diagram illustrating a process for sorting time-ordered bit sequences within a set of time-ordered bit sequences that is generated by the instrumented target application in accordance with the present invention.

FIG. 8 is a flow diagram generally illustrating a process for sorting time-ordered bit sequences within a set of time-ordered bit sequences that is generated by the instrumented target application in accordance with the present invention. The process begins at step 810, where a comparison function is selected. The comparison function compares two time-ordered bit sequences and provides a result by which a sorting mechanism can sort the sequences within the set of time-ordered bit sequences. The comparison function can be any mechanism by which temporal information contained in one time-ordered bit sequence can be evaluated against temporal information contained in another time-ordered bit sequence. As described below, the comparison function can be selected to optimize the execution of the target application at a particular time.

At a simple level, the numerical value of one time-ordered bit sequence can be compared against the numerical value of another time-ordered bit sequence. The comparison function can return a result indicates whether a first sequence was "less than," "greater than," or "equal to" the second sequence. If two sequences are found to be equal, a particular comparison value of "greater than" or "less than" can be returned in order to avoid arbitrary results.

More sophisticated comparison functions can evaluate bit positions within time-ordered bit sequences to allow for optimization of target software for a particular time interval. A comparison function may use a combination of parameter pairs from the two time-ordered bit sequences that are to be compared. The parameter pairs may include the first set bit position, the length of the first set bit sequence, the last set bit position, and the length of the last set bit sequence from both of the time-ordered bit sequences. Each parameter pair can be evaluated in turn until an inequality is reached. For example, comparing two time-ordered bit sequences that have the same first set bit positions and sequence lengths but that have different last set bit positions and sequence lengths would require three evaluations. If all parameter pairs are found to be equal, the comparison function can be recursively (or iteratively) called using shortened versions of the time-ordered bit sequences that are being compared. If all parameter pairs are found to be equal time-ordered bit sequence subsequences, the time-ordered bit sequence subsequences can be shortened again and the comparison function recursively called until an inequality is reached. If an inequality is not reached, a predetermined comparison value of "greater than" or "less than" can be returned in order to avoid arbitrary results.

The order in which a combination of parameters is evaluated can be specified such that the target software can be optimized for a particular time period. For example, the first set bit positions and first set bit sequence lengths can be evaluated before the last set bit positions and the last set bit sequence lengths are evaluated. This results in the placement of data units for the target software being optimized for the startup portion of executing the target software. Other comparison functions can evaluate interior portions of time-ordered bit sequences such that target software data unit placement can be optimized for the run-time portion of executed target software. Additionally, the bit runs within the sequences may be evaluated in a right-to-left (i.e., in the opposite direction of time) or left-to-right order (i.e. in the same direction as time).

At step 820, a sort routine is invoked. The sort routine is used to sort the order of time-ordered bit sequences within an array of such sequences. The sort routine invokes the selected comparison function repeatedly during the course of executing a sorting algorithm as previously described. In various embodiments, the sort routine maintains a mapping of the newly ordered time-ordered bit sequences to the originally ordered time-ordered bit sequences. In other embodiments, the mapping can be generated after the sort is completed. At step 830, the mapping of the new-to-old time-ordered bit sequences is saved.

Figure 9:
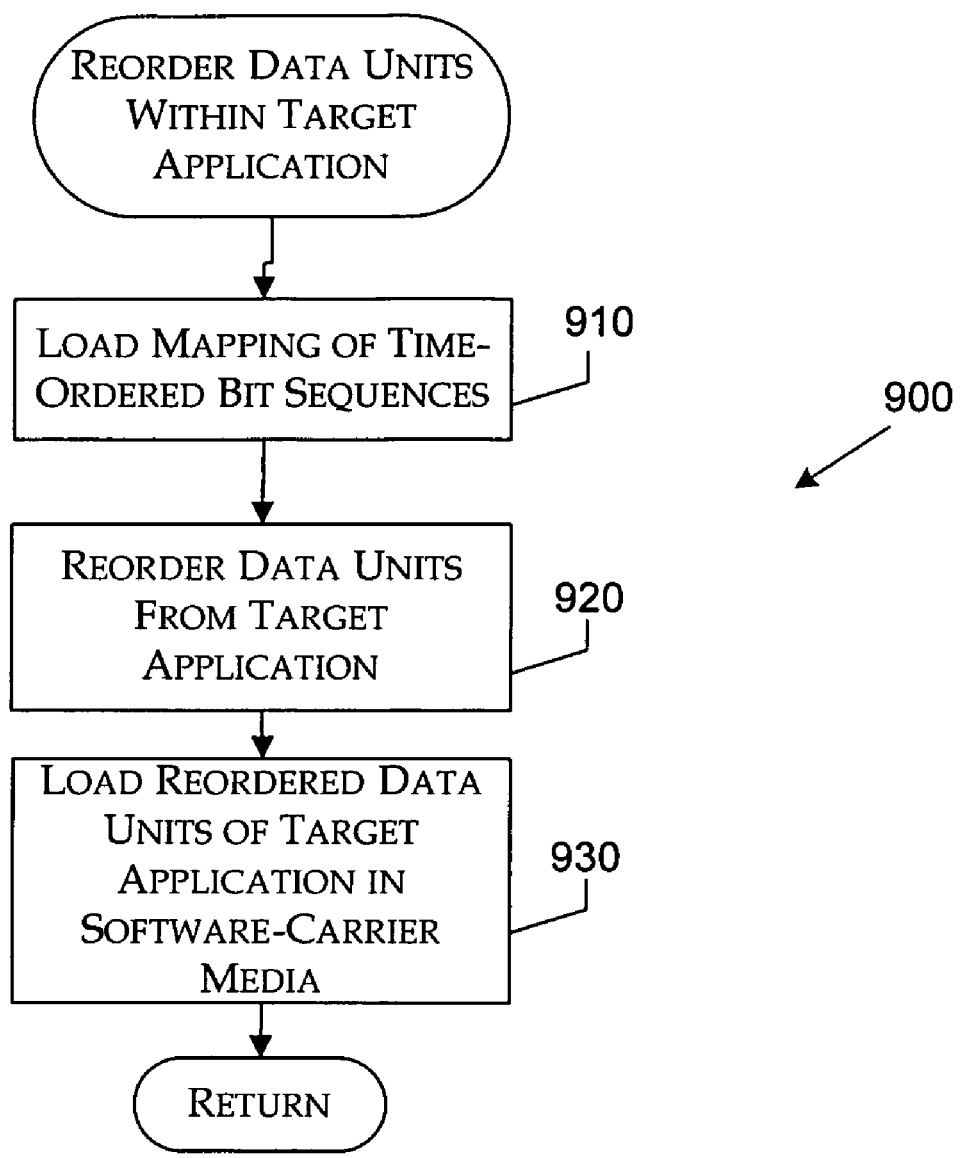
FIG. 9 is a flow diagram illustrating a process for reordering code and data units within a target application in accordance with the present invention.

FIG. 9 is a flow diagram generally illustrating a process for reordering code and data units within a target application in accordance with the present invention. At step 910, the mapping of the new-to-old time-ordered bit sequences is accessed. At step 920, the data units from the executed target software are reordered according to the mapping. This entails iteratively locating a data unit that is pointed to by the mapping and subsequently storing the located data unit in the order as indicated by the mapping. At step 930, the reordered data units are stored in a computer-readable medium (such as volatile memory, for example). In other embodiments, steps 920 and 930 may be combined by directly writing the located data units to the computer-readable medium according to the order specified in the mapping. Thus, the data units are efficiently arranged for rapid access of the data units during execution of the target software application.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for optimizing the ordering of data units for access by a target application, comprising the steps of:

executing the target application such that the data units are accessed by the target application;

generating time-ordered sequences that indicate the status of whether a data unit of the target application has been accessed during each time interval within a sequence of time intervals, wherein the sequence of time intervals is contemporaneous with the executing of the target application;

determining a first position in a first time-ordered sequence for a first data unit, wherein the first position in the first time-ordered sequence indicates the first time interval in which the first data unit of the target application has been accessed;

determining a length of consecutive positions from the first position in the first time-ordered sequence, wherein the length of consecutive positions from the first position in the first time-ordered sequence is indicative of the number of successive time intervals in which the first data unit of target application has been accessed;

determining a first position in a second time-ordered sequence for a second data unit, wherein the first position in the second time-ordered sequence indicates the first time interval in which the second data unit of the target application has been accessed;

determining a length of consecutive positions from the first position in the second time-ordered sequence, wherein the length of consecutive positions from the first position in the second time-ordered sequence is indicative of the number of successive time intervals in which the second data unit of target application has been accessed, wherein the first positions of the first and second time-ordered sequences are selected in accordance with the latest time intervals in which the respective first and second data units have been accessed, and the lengths of the consecutive positions from the first positions of the first and second time-ordered sequences reflect time intervals that occur before the respective first positions of the first and second time-ordered sequences;

sorting the array of time-ordered sequences by comparing the first position in the first time-ordered sequence and the length of consecutive positions from the first position in the first time-ordered sequence with the first position in the second time-ordered sequence and the length of consecutive positions from the first position in the second time-ordered sequence, mapping the correspondence between the generated and the sorted time-ordered sequences; and arranging the accessed data units in a computer-readable medium according to the mapped correspondence of the generated and the sorted time ordered sequences.

2. The method of claim 1, further comprising:

determining a last position in a first time-ordered sequence for a first data unit, wherein a second position in the first time-ordered sequence indicates the last time interval in which the first data unit of the target application has been accessed;

determining a length of consecutive positions from the last position in the first time-ordered sequence, wherein the length of consecutive positions from the last position in the first time-ordered sequence is indicative of the number of successive time intervals in which the first data unit of target application has been accessed;

determining a last position in a second time-ordered sequence for a second data unit, wherein the last position in the second time-ordered sequence indicates the last time interval in which the second data unit of the target application has been accessed;

determining a length of consecutive positions from the last position in the second time-ordered sequence, wherein the length of consecutive positions from the last position in the second time-ordered sequence is indicative of the number of successive time intervals in which the second data unit of target application has been accessed; and comparing the last position in the first time-ordered sequence and the length of consecutive positions from the last position in the first time-ordered sequence with the last position in the second time-ordered sequence and the length of consecutive positions from the last position in the second time-ordered sequence.

3. The method of claim 1, wherein the first and second time-ordered sequences are selected in accordance with a logarithmic sorting technique.

4. The method of claim 1, further comprising the steps of:

decomposing a data unit that is associated with the time-ordered bit sequence into smaller data units that are smaller than the data unit being decomposed;

sorting the smaller data units by comparing each smaller data unit which each of the other smaller data units such that a more efficient order than the efficiency of the original ordering of the data units of the target application is determined; and arranging the smaller data units according to the determined more efficient order.

5. A system for optimizing the ordering of data units for access by a target application, comprising:

means for executing the target application such that the data units are accessed by the target application;

means for determining a length of consecutive positions from the first position in the second time ordered sequence, wherein the length of consecutive positions from the first position in the second time-ordered sequence is indicative of the number of successive time intervals in which the second data unit of target application has been accessed, wherein the first positions of the first and second time-ordered sequences are selected in accordance with the latest time intervals in which the respective first and second data units have been accessed, and the lengths of the consecutive positions from the first positions of the first and second time-ordered sequences reflect time intervals that occur before the respective first positions of the first and second time-ordered sequences;

means for generating time-ordered bit sequences that indicate the status of whether a data unit of the target application has been accessed during each time interval within a sequence of time intervals, wherein the sequence of time intervals is contemporaneous with the executing of the target application;

means for sorting the array of time-ordered bit sequences by comparing consecutive data contained within the time-ordered bit sequences, wherein the length of the consecutive data is changed in response to an equal comparison between consecutive data from a first time-ordered bit sequence and consecutive data from a second time-ordered sequence, wherein the first and the second time-ordered bit sequences are contemporaneous, wherein a first sequence of bits from a first sequence of a first time-ordered bit sequence is compared with a first sequence of bits from a second time-ordered bit sequence;

means for mapping the correspondence between the generated and the sorted time-ordered bit sequences; and means for arranging the accessed data units in a computer-readable medium according to the mapped correspondence of the generated and the sorted time ordered bit sequences.

6. The system of claim 5, wherein the first sequence of bits is specified by an address that indicates a first set bit position and a length that indicates the number of consecutive set bit positions in the first sequence of bits.

7. The system of claim 5, wherein the means for comparing information comparison function further comprises means for comparing a last sequence of bits front a second sequence of a first time-ordered bit sequence with a last sequence of bits from a second sequence of a second time-ordered bit sequence.

8. The system of claim 5, wherein the means for comparing information comprises:

means for comparing a first set bit position and a number of consecutive set bit positions from the first set bit position in the first time-ordered bit sequence with a first set bit position and a number of consecutive set bit positions from the first set bit position in the second time-ordered bit sequence; and means for comparing a last set bit position and a number of consecutive set bit positions from the last set bit position in the first time-ordered bit sequence with a last set bit position and a number of consecutive set bit positions from the last set bit position in the second time-ordered bit sequence.

9. The system of claim 5, further comprising:

means for decomposing a data unit that is associated with the time-ordered bit sequence into smaller data units;

means for sorting the smaller data units by comparing each smaller data unit which each of the other smaller data units such that an efficient order is determined; and means for arranging the smaller data units according to the determined efficient order.

* * * * *